United States Patent
Good

(10) Patent No.: US 11,748,930 B1
(45) Date of Patent: *Sep. 5, 2023

(54) SYSTEMS AND METHODS FOR RIGGING A POINT CLOUD FOR ANIMATION

(71) Applicant: Illuscio, Inc., Culver City, CA (US)

(72) Inventor: Max Good, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,028

(22) Filed: Jan. 16, 2023

Related U.S. Application Data

(63) Continuation of application No. 17/822,597, filed on Aug. 26, 2022, now Pat. No. 11,557,074.

(51) Int. Cl.
| | | |
|---|---|---|
| *G06T 13/20* | (2011.01) | |
| *G06T 7/73* | (2017.01) | |
| *G06T 7/60* | (2017.01) | |

(52) U.S. Cl.
CPC ............... *G06T 13/20* (2013.01); *G06T 7/60* (2013.01); *G06T 7/74* (2017.01); *G06T 2200/24* (2013.01);
(Continued)

(58) Field of Classification Search
CPC . G06T 2207/10028; G06T 2207/20081; G06T 2207/20084; G06T 17/00; G06T 7/11; G06T 7/50; G06T 2207/10016; G06T 7/73; G06T 7/70; G06T 19/006; G06T 19/20; G06T 2207/30196; G06T 2200/04; G06T 19/00; G06T 7/521; G06T 2200/08;
(Continued)

(56) References Cited

U.S. PATENT DOCUMENTS

| | | | |
|---|---|---|---|
| 2014/0300597 A1* | 10/2014 | Holcomb | G06V 20/64 345/420 |
| 2015/0178988 A1* | 6/2015 | Montserrat Mora | G06T 17/20 345/420 |

(Continued)

OTHER PUBLICATIONS

Timestamps and Explanation from Arena4D Animation Tutorial. YouTube, YouTube, Dec. 15, 2021, https://www.youtube.com/watch?v=DAzrps3HGco&t=519s. Accessed Jun. 21, 2023 (Year: 2021).*

(Continued)

*Primary Examiner* — Xiao M Wu
*Assistant Examiner* — Scott E Sonners
(74) *Attorney, Agent, or Firm* — Ansari Katiraei LLP; Arman Katiraei; Sadiq Ansari

(57) ABSTRACT

Disclosed is a rigging system for animating the detached and non-uniformly distributed data points of a point cloud. In response to a selection of a region of space in which a first set of data points are located, the system may identify commonality in the positional or non-positional elements of a first subset of the first set of data points, and may determine that a second subset of the first set of data points lack the commonality. The system may refine the first set of data points to a second set of data points that includes the first subset of data points and that excludes the second subset of data points. The system may link the second set of data points to a bone of a skeletal framework, and may animate the second set of data points based on an animation that is defined for the bone.

18 Claims, 9 Drawing Sheets

(52) U.S. Cl.
CPC .............. *G06T 2207/10024* (2013.01); *G06T 2207/10028* (2013.01); *G06T 2210/56* (2013.01)

(58) Field of Classification Search
CPC ........... G06T 7/194; G06T 7/10; G06T 13/40; G06T 15/00; G06T 9/002; G06T 1/0007; G06T 2207/20092; G06T 2207/30008; G06T 2207/20124; G06T 13/00; G06T 13/20; G06N 3/0454; G06N 20/00; G06V 10/82; G06V 10/764; G06V 20/64; G06V 20/20

See application file for complete search history.

(56) References Cited

U.S. PATENT DOCUMENTS

| | | | |
|---|---|---|---|
| 2016/0284135 A1 | 9/2016 | Kamhi et al. | |
| 2018/0240281 A1* | 8/2018 | Vincelette | G06T 15/20 |
| 2021/0343081 A1 | 11/2021 | Mermerkaya | |
| 2022/0101603 A1* | 3/2022 | Ni | G06V 40/103 |
| 2022/0189119 A1* | 6/2022 | Seo | G06T 17/205 |
| 2022/0366627 A1 | 11/2022 | Comer et al. | |

OTHER PUBLICATIONS

Xu Z, Zhou Y, Yi L, Kalogerakis E. Morig: Motion-aware rigging of character meshes from point clouds. InSIGGRAPH Asia 2022 Conference Papers Nov. 29, 2022 (pp. 1-9) (Year: 2022).*

* cited by examiner

US 11,748,930 B1

SYSTEMS AND METHODS FOR RIGGING A POINT CLOUD FOR ANIMATION

CLAIM OF BENEFIT TO RELATED APPLICATIONS

This application is a continuation of U.S. nonprovisional application Ser. No. 17/822,597 entitled "Systems and Methods for Rigging a Point Cloud for Animation", filed Aug. 26, 2022 and issued as U.S. Pat. No. 11,557,074. The contents of application Ser. No. 17/822,597 are hereby incorporated by reference.

BACKGROUND

Animation rigging has been used with mesh-based or polygon-based three-dimensional ("3D") models to simplify the animation of these 3D models. The rigging may introduce a skeletal framework within a wireframe of the 3D model. The skeletal framework may be defined with "bones" that have various pivot points. Bones from the skeletal framework that share a common pivot point may be defined with weighting to specify how and where one bone moves about a pivot point when the neighboring bone is moved. The meshes or polygons may be attached or layered over the wireframe so that they move in conjunction with movements applied to the skeletal framework.

DETAILED DESCRIPTION OF PREFERRED EMBODIMENTS

The following detailed description refers to the accompanying drawings. The same reference numbers in different drawings may identify the same or similar elements.

Provided are systems and methods for rigging a point cloud for animation. The rigging of a point cloud differs from the rigging of a mesh-based or polygon-based three-dimensional ("3D") model because the point cloud is not associated with any wireframe that wraps around and that moves relative to a skeletal framework. Instead, the point cloud may include a set of data points that may be non-uniformly distributed in a 3D space and that have no bonds or linkages between them. Accordingly, the data points remain detached and disconnected from the bones of the skeletal framework, and any animation of the point cloud would require the painstaking task of connecting each of several million data points to at least one bone of the skeletal framework.

To simplify the animation of a point cloud, the systems and methods may include a point cloud rigging system ("PCRS"). The PCRS may perform a semi-autonomous or fully autonomous linking of the point cloud data points to bones of a skeletal framework, and may semi-autonomously or fully autonomously associate weights to different sets of data points to produce concerted or linked movements without having a digital wireframe surrounding the skeletal framework. In some embodiments, the PCRS may use one or more artificial intelligence and/or machine learning ("AI/ML") techniques to partially or wholly define the skeletal framework, partially or wholly automate the rigging of the point cloud data points to different bones of the skeletal framework, and/or partially or wholly define the weighting, range of motion, and/or other animation for different sets of data points that are linked to different bones of the skeletal framework.

Figure 1:
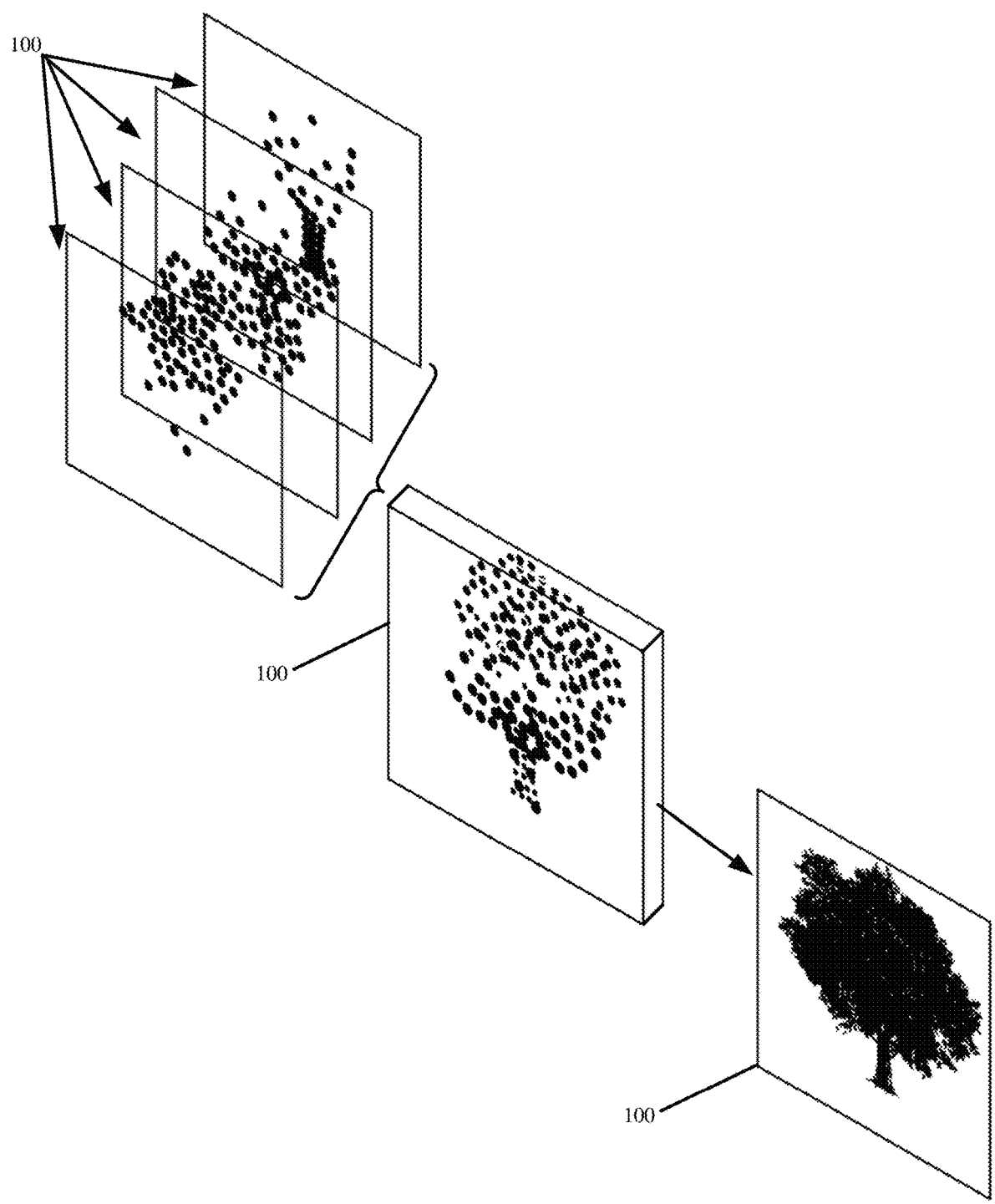
FIG. 1 illustrates an example point cloud in accordance with some embodiments presented herein.

FIG. 1 illustrates an example point cloud 100 in accordance with some embodiments presented herein. Point cloud 100 may represent a 3D object or 3D model that is to be animated using the PCRS.

The data points of point cloud 100 may differ from pixels of a two-dimensional ("2D") image, because certain regions of point cloud 100 may have no data points, lower densities of data points, and/or higher densities of data points based on varying amounts of visual information that is detected or scanned at those regions. Additionally, the position of the point cloud data points may be defined in 3D space using x, y, and z coordinate values. In contrast, pixels of a 2D image are defined in 2D space and have a uniform density or fixed arrangement that is defined by the resolution of the 2D image. In other words, the point cloud data points may have a non-uniform placement or positioning, whereas the 2D image may have pixel data for each pixel of a defined resolution (e.g., 640×480, 800×600, etc.).

Each point cloud data point may be defined with a plurality of elements. The plurality of elements may include a first set of positional elements, and a second set of non-positional or descriptive elements.

The positional elements may include coordinates within 3D space. For instance, each point cloud data point may include x-coordinate, y-coordinate, and z-coordinate elements to capture the position of an imaged surface, feature, or article of the 3D object or the 3D environment in 3D space.

The non-positional elements may include information about the detected characteristics of the surface, feature, or article imaged at a corresponding position in 3D space. The characteristics may correspond to a detected color. The color may be represented using red, green, blue ("RGB"), and/or other values. In some embodiments, the characteristics may provide the chrominance, hardness, translucence, reflectivity, luminance, metallic characteristics, roughness, specular, diffuse, albedo, index of refraction ("IOR"), and/or other properties of the imaged surface, feature, or article. In some embodiments, the non-positional elements may directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

In some embodiments, the characteristics may be related to properties of the device used to generate each of data points. For instance, the characteristics may include a Tesla strength value to quantify the strength of the magnetic field that was used in detecting and/or imaging the surface, feature, or article represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other values.

Point cloud 100 and the individual data points of point cloud 100 may be generated by a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each data point in 3D space, and a second imaging device (e.g., a high-resolution camera) may measure or capture the characteristics or other non-positional information for each data point. One or more photogrammetry techniques may be used to consolidate the data from the first imaging device and the second imaging device, and to create the point cloud 100.

Figure 2:
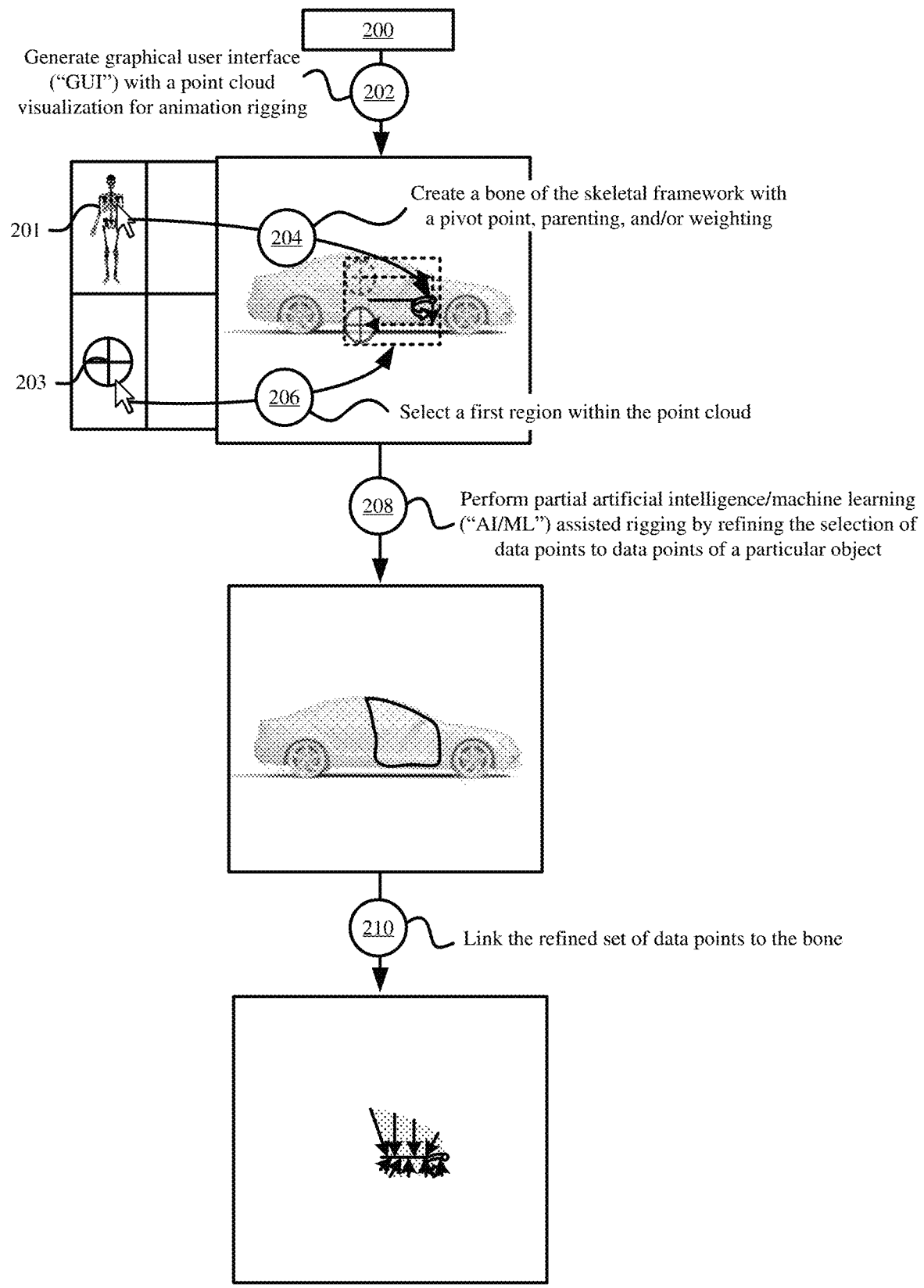
FIG. 2 illustrates an example of partial artificial intelligence and/or machine learning ("AI/ML")—assisted point cloud rigging in accordance with some embodiments presented herein.

FIG. 2 illustrates an example of partial AI/ML-assisted point cloud rigging in accordance with some embodiments presented herein. PCRS 200 may load and/or render a point cloud that is to be animated. Rendering the point cloud may include generating a visualization of the 3D object or 3D model represented by the point cloud data points. More specifically, rendering the point cloud may include defining visual points of reference based on the positional elements and non-positional elements of each data point in the point cloud.

PCRS 200 may generate (at 202) a graphical user interface ("GUI") to present the visualization (e.g., rendered point cloud) to a user for rigging. The GUI may include various interactive user interface ("UI") elements or interactive tools for rigging the visualized data points to a skeletal framework.

The user may use first interactive tool 201 to create (at 204) a bone of the skeletal framework within the 3D space of the visualization. Creating (at 204) the bone may include drawing a straight, curved, or jagged line that represents the bone. In some embodiments, the bone may be a multi-dimensional (e.g., 3D) shape with segments that extend across different planes or axes. In some embodiments, the bone may be connected to or linked to other bones of the skeletal framework via one or more pivot points. The bone may cut through and/or intersect one or more of the point cloud data points represented in the visualization. In other words, the coordinates of the user-defined bone may have x, y, and z coordinates that match the positional coordinates of one or more point cloud data points.

Creating (at 204) the bone may further include defining one or more pivot points about which the bone may rotate or move, and/or defining a parenting or a relationship between the user-created bone and other bones of the skeletal framework that may be already defined. Defining the parenting or the relationship may include connecting the user-created bone to other bones of the skeletal framework, and specifying a weighting that controls how the user-created bone moves when a force or movement is applied to another connected bone of the skeletal framework.

Once the shape and position of the user-defined bone are established, PCRS 200 may associate a unique identifier to the user-defined bone. The unique identifier may be a numerical value or pointer for referencing or accessing the user-defined bone and for differentiating the user-defined bone from other bones that may be part of the same skeletal framework.

The user may use second interactive tool 203 to select (at 206) a first region of the visualized 3D object or 3D model. The first region may include a volume of 3D space that includes a first set of the point cloud data points. PCRS 200 may identify the first set of data points by determining the coordinates covered by the selected volume or region of space, and by determining that the positional elements of the first set of data points are within the coordinates covered by the selected volume or region of space.

In some embodiments, the selection tools (e.g., second interactive tool 203) may include adjustable 3D shapes (e.g., sphere, cube, cuboid, cylinder, etc.) for selecting the volume of 3D space. In some embodiments, the selection tools may include a freeform tool that may be used to select any 2D or 3D region of space.

Given the density of the point cloud data points, the selected first set of data points may include data points of two or more objects that the user may want to animate separately or have different animations. Also, it may be very time consuming and difficult to select and differentiate the data points of one object from other objects especially when the objects may be linked or touching one another. Accordingly, the selection (at 206) of the first region and/or the first set of data points is intended to be a rough selection that mostly includes data points of a first object, and may include data points of other surrounding objects or background objects. For instance, the selection (at 206) shown in FIG. 2 may mostly include data points of the passenger front door, but may also include data points of the rear passenger door, a section of the roof, and a side panel of the vehicle engine compartment.

PCRS 200 may use one or more AI/ML techniques to refine (at 208) the selection and partially assist in the rigging of the point cloud data points to the created bone. Refining (at 208) the selection may include automatically identifying a particular object that is represented by the majority of the first set of data points falling within the selected first region, removing one or more data points from the first set of data points that are not associated with or part of the particular object, and adding one or more data points outside the selected first region that are associated with or part of the particular object. Specifically, PCRS 200 may use the AI/ML techniques to analyze the positional and non-positional elements of the first set of data points, determine positional commonality amongst a threshold percentage or number of the first set of data points (e.g., more than half of the first set of data points or at least 80% of the first set of data points having the determined positional commonality), and/or determine non-positional commonality amongst the threshold percentage or number of the first set of data points.

Determining the positional commonality may include using one or more regression techniques, pattern recognition techniques, predictive analytics, and/or other AI/ML techniques to determine whether the first set of data points are arranged or positioned according to a pattern, a structure, or a recognized object. For instance, a first object (e.g., vehicle door) may have data points that are positioned and spaced according to a particular pattern or structure, or may have data points that are a certain distance or offset from one another. Data points of a second object (e.g., vehicle roof) may have positioning, spacing, distances, or offsets that deviate from those of the first object, and PCRS 200 may refine (at 208) the user selection by removing the data points of the second object from the first set of data points or the data points that deviate from the positioning, spacing, distances, or offsets of the first object. Similarly, the AI/ML techniques may analyze the arrangement of the first set of data points to determine that the data points represent a particular object, and may add, to the first set of data points in the user selection that represent the first object, one or more data points that are a threshold distance outside the user selection and that share the positioning, arrangement, pattern, spacing, distances, and/or offsets with the first set of data points representing the first object.

Determining the non-positional commonality may include using one or more regression techniques, pattern recognition techniques, predictive analytics, and/or other AI/ML techniques to determine whether the first set of data points have common visual characteristics (e.g., coloring) and/or other commonality (e.g., common material properties, albedo values, etc.) amongst the non-positional elements. For instance, a first object may have data points that span a specific range of RGB color values. The AI/ML techniques may identify that a majority of the first set of data points have RGB color values within the specific range of RGB color values, and may refine (at 208) the user selection by removing other data points from the first set of data points that do not have the RGB color values, and by adding data points that are a threshold distance outside the user selection and that are defined with RGB color values that are within the specific range of RGB color values.

Determining the non-positional commonality may also include identifying the material property that is defined as a non-positional element for the majority of the first set of data points, removing data points from the first set of data points that are defined with a different material property, and adding data points that neighbor the first set of data points, that are outside the user-selected region, and that are defined with the same material property as the majority of the data points within the first set of data points.

In some embodiments, the AI/ML techniques may refine (at 208) the user selection based on a combination of positional and non-positional commonality. For instance, PCRS 200 may analyze the positional and non-positional elements of the first set of data points within the user selected region using the AI/ML techniques to identify positional and non-positional commonality shared by a threshold percentage or number of the data points. PCRS 200 may use the combined positional element and non-positional element commonality to identify and remove data points within the first set of data points that do not have the combined positional element and non-positional element commonality and to add data points to the first set of data points that are a threshold distance outside the user selection and that share the combined positional element and non-positional element commonality.

PCRS 200 may link (at 210) the refined first set of data points to the user-defined bone of the skeletal framework, thereby rigging the refined first set of data points to the user-defined bone. In some embodiments, linking (at 210) the refined first set of data points may include associating the identifier of the user-defined bone to each data point of the refined first set of data points. For instance, PCRS 200 may define a non-positional element of each data point of the refined first set of data points with the unique identifier of the user-defined bone. From the non-positional element, PCRS 200 is able to identify which data points are linked to which bones, and which data points should be moved in response to an animation that is applied to a bone. In some embodiments, linking (at 210) the refined first set of data points may include inversely associating a unique identifier of each data point from the refined first set of data points to an array of the user-defined bone. For instance, the positional elements of the refined first set of data points may unique identify each of the refined first set of data points. PCRS 200 may link an array to the user-defined bone that includes the positional elements or unique identifier of each data point in the refined first set of data points. Accordingly, when the user-defined bone is animated or moved, PCRS 200 may perform a lookup of the linked array to determine which data points from the point cloud to animate in conjunction with the user-defined bone.

To facilitate the movement of data points in relation to the bone, the linking (at 210) may include determining the distance of each data point of the refined first set of data points to the bone, and maintaining that distance when the linked bone is moved. In some embodiments, PCRS 200 may compute the distance from each data point in the refined first set of data points to one or more points along the bone or may determine a vector that separates the data point from the bone, and may record the computed distances or vector as a positional or non-positional element of the data point.

Figure 3:
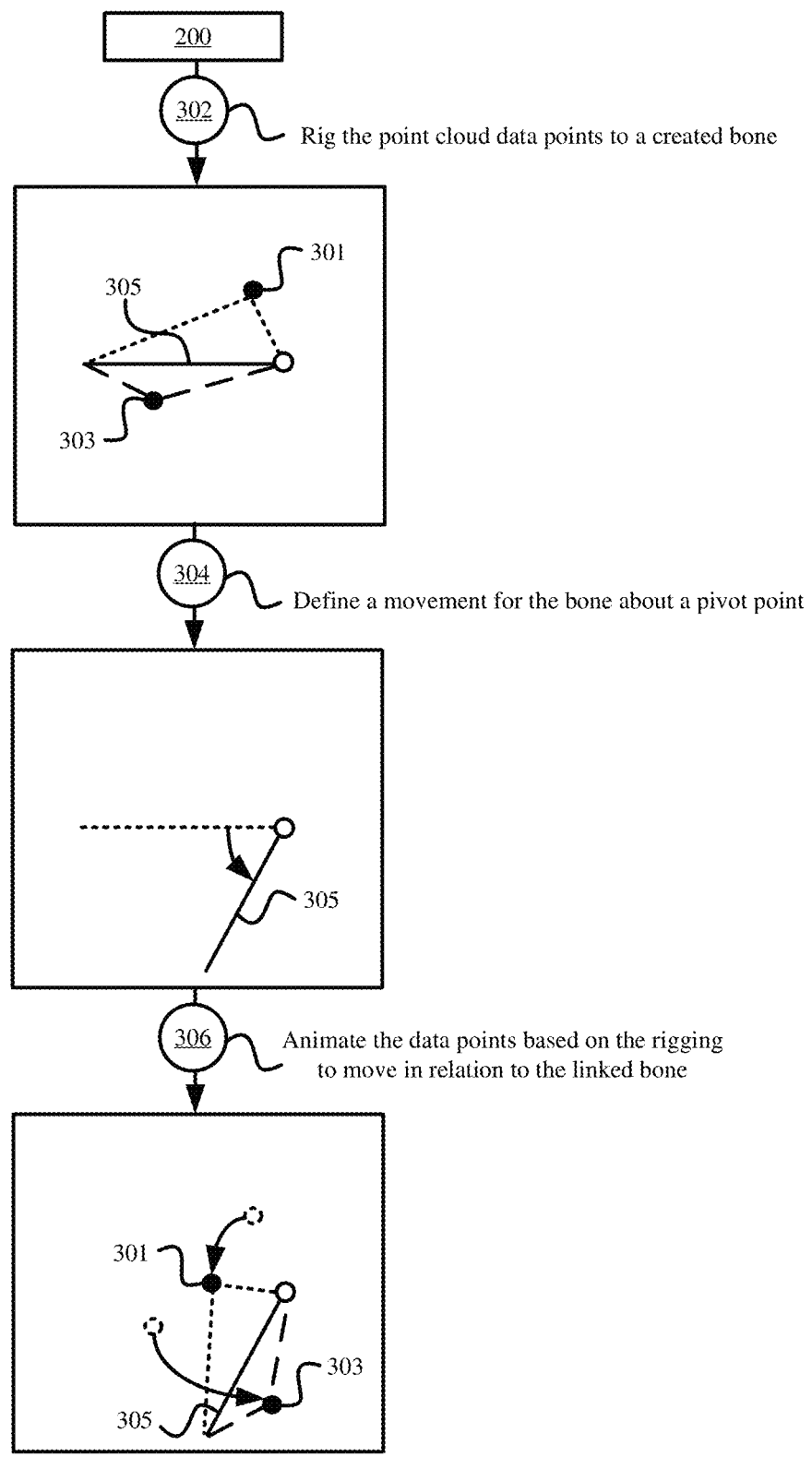
FIG. 3 illustrates an example of animating two data points in accordance with some embodiments presented herein.

FIG. 3 illustrates an example of animating two data points 301 and 303 in accordance with some embodiments presented herein. PCRS 200 may rig (at 302) data points 301 and 303 to bone 305 of a skeletal framework. The rigging (at 302) may include linking data points 301 and 303 to bone 305, and determining the distance of data points 301 and 303 to one or more points about bone 305.

An animation may be defined (at 304) by moving bone 305 about one or more pivot points. In some embodiments, the movement may be defined (at 304) as a force that is applied to bone 305 at one or more points in one or more directions and with a specified intensity. In some embodiments, the movement may be defined (at 304) based on user input, forward or inverse kinematics, a physics engine, and/or forces that are generated to simulate environmental conditions or other factors. The forward or inverse kinematics may include generating a movement of bone 305 based on forces or movements applied to other bones of a skeletal framework that are directly or indirectly connected to bone 305.

PCRS 200 may animate (at 306) data points 301 and 303 to move in relation to linked bone 305. Specifically, PCRS 200 may first perform a lookup to determine which data points are linked to bone 305. In some embodiments, PCRS 200 may scan the non-positional elements of the data points to identify data points 301 and 303 as containing the identifier of bone 305. In some other embodiments, PCRS 200 may query the linked list or array of bone 305 to obtain the unique identifiers for data points 301 and 303. PCRS 200 may then adjust the positioning of data points 301 and 303 and other data points that are linked to bone 305 so that the linked data points (e.g., data points 301 and 303) retain their position relative to the updated position of bone 305.

PCRS 200 may provide partial assistance to improve the accuracy for rigging different sets of data points, that represent different objects within a point cloud, to different bones of a skeletal framework so that the animation of a user-defined bone for a particular object animates the data points that represent that particular object in the point cloud and exclude neighboring or intermixed data points of other objects. In some embodiments, PCRS 200 may use the AI/ML techniques to further simplify the rigging of point cloud data points to different bones of the skeletal framework.

Figure 4:
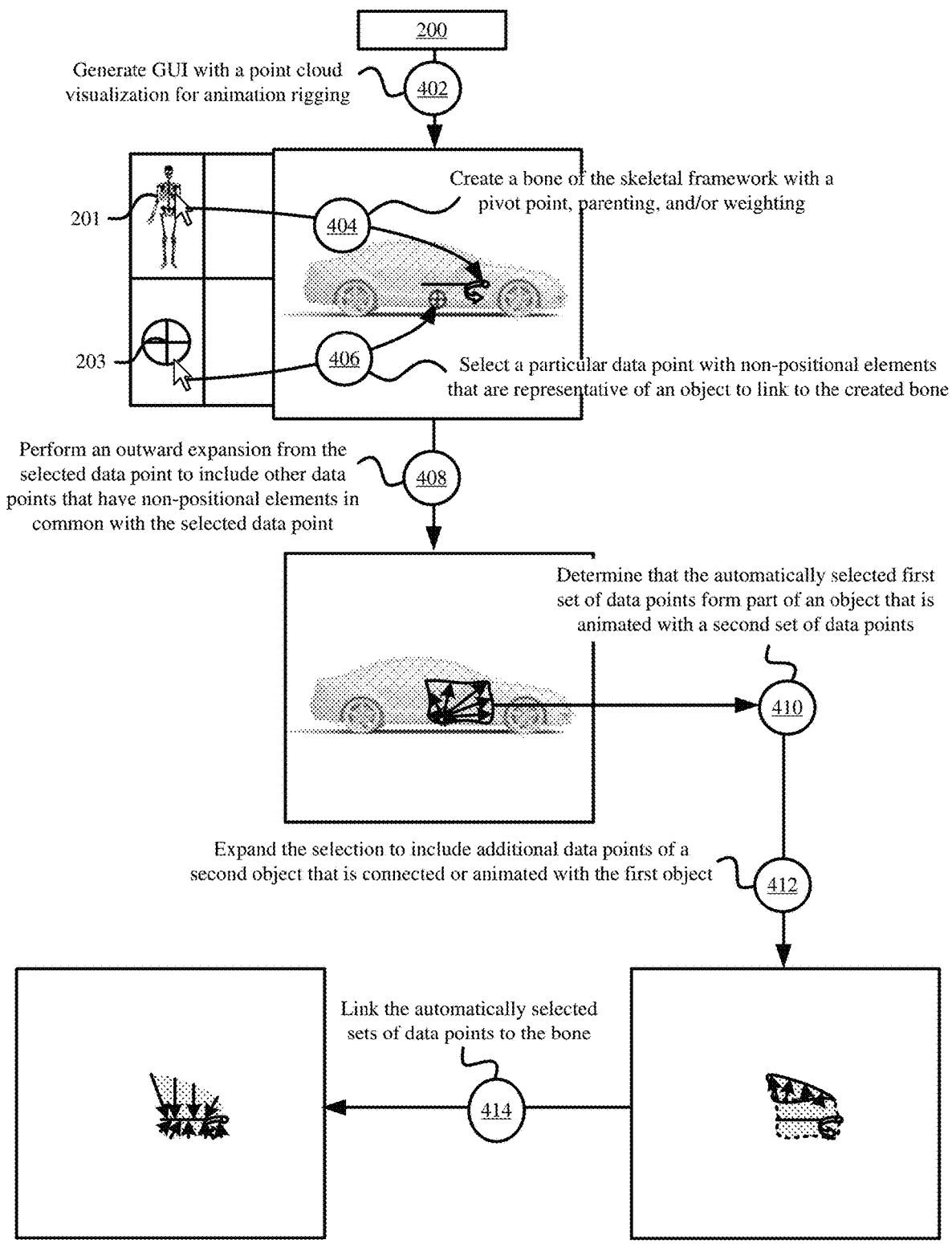
FIG. 4 illustrates an example of a semi-automated rigging of point cloud data points for animation in accordance with some embodiments presented herein.

FIG. 4 illustrates an example of a semi-automated rigging of point cloud data points for animation in accordance with some embodiments presented herein. PCRS 200 may generate (at 402) the GUI that presents a rendered point cloud and various UI elements or interactive tools that a user may use to control the rigging of the point cloud data points.

The user may use first interactive tool 201 to create (at 404) a bone of the skeletal framework that is to control the animation of a set of the point cloud data points for one or more objects represented in the point cloud. The user may use second interactive tool 203 to initiate the rigging of the set of data points to the created (at 404) bone. However, rather than coarsely select an entire region or a set of data points that may include data points of different elements, the user may use second interactive tool 203 to select (at 406) a single data point that contains non-positional elements that are representative of a particular object that the user seeks to rig to the bone.

PCRS 200 may use one or more AI/ML techniques to analyze the non-positional elements of the selected data point, and to perform (at 408) an outward expansion from the selected data point to include other data points that have non-positional elements in common or are within a threshold range of the non-positional elements of the selected data point. In this manner, PCRS 200 may automatically select the set of data points for a particular object based on the selection of a single data point by the user.

As the outward expansion grows to include a set of data points, PCRS 200 may use one or more AI/ML techniques to analyze the set of data points that have been automatically selected, and to determine whether the set of data points form part of a recognized object. For instance, PCRS 200 may determine that the spacing or arrangement of the set of data points matches the spacing or arrangement of a first set of data points from a particular object, and that the coloring and material properties of the set of data points matches the coloring and material properties of the particular object.

PCRS 200 may further determine that the particular object is formed from the first set of data points, that are matched to the automatically selected set of data points, and a second set of data points that have different commonality amongst their respective non-positional elements. For instance, in FIG. 4, the AI/ML techniques may determine (at 410) that the automatically selected set of data points represent a first part of the passenger side door of a vehicle. The AI/ML techniques may further determine (at 410) that the passenger side door has and/or is animated with a second part that corresponds to the window and window frame of the passenger side door, and that the automatically selected set of data points do not include data points for the window and window frame because the window and window frame are represented by data points with different arrangements, coloring, and/or material properties than the automatically selected set of data points representing the vehicle door. Specifically, the AI/ML techniques may be trained with sample training data that demonstrate the vehicle door moving or being animated with the window and window frame.

PCRS 200 may determine the arrangement, coloring, material properties, and/or other commonality amongst the positional elements and non-positional elements of the point cloud data points that may be used to isolate a second set of data points that represent the window and the window frame. In some embodiments, training the AI/ML techniques may include determining different objects that are connected or animated together, and determining the different commonality, patterns, and/or other characteristics for uniquely identifying each of the connected objects. Accordingly, PCRS 200 may expand (at 412) the automatic selection to include the second set of data points that have positional and/or non-positional commonality with the second object that is connected or animated with the first object represented by the automatically selected first set of data points.

PCRS 200 may link (at 414) the automatically selected first set of data points representing the vehicle door and the automatically selected second set of data points representing the window of the vehicle door to the user-created bone, wherein the entire selection of the first and second sets of data points was based on a single data point selected (at 406) by a user that had the non-positional characteristics of other data points of the vehicle door. Consequently, the data points that have positional and non-positional commonality with the initial data point selected by the user and that are identified as forming two or more connected objects by the AI/ML techniques may be rigged to a bone of the skeletal framework and may move in conjunction with that bone.

As another example, the particular object may correspond to a vehicle wheel that is formed by a tire having a first arrangement and first coloring and a wheel rim at the center of the tire having a second arrangement and second coloring. PCRS 200 may determine that an initial data point selected by the user corresponds to a single data point of a tire and that the set of data points initially selected by the outward expansion from the single data point includes the data points in the first arrangement and with the first coloring that represent the tire. Accordingly, PCRS 200 may expand the selection inwards to identify a second set of data points with the second arrangement and the second coloring, and may automatically select the second set of data points based on the AI/ML recognizing that the first set of data points represent the vehicle wheel and that the object also includes the second set of data points with the second arrangement and second coloring that was not manually selected by the user.

The semi-autonomous rigging embodiments described above assist the user in accurately selecting sets of data points to link to different bones of the skeletal framework so that the user does not have to individually select each data point of the point cloud to link to a bone or precisely differentiate linking neighboring data points of different objects to different bones. In some embodiments, PCRS 200 may perform a fully autonomous rigging to further minimize or eliminate the user input needed to rig point cloud data points for animation.

Figure 5:
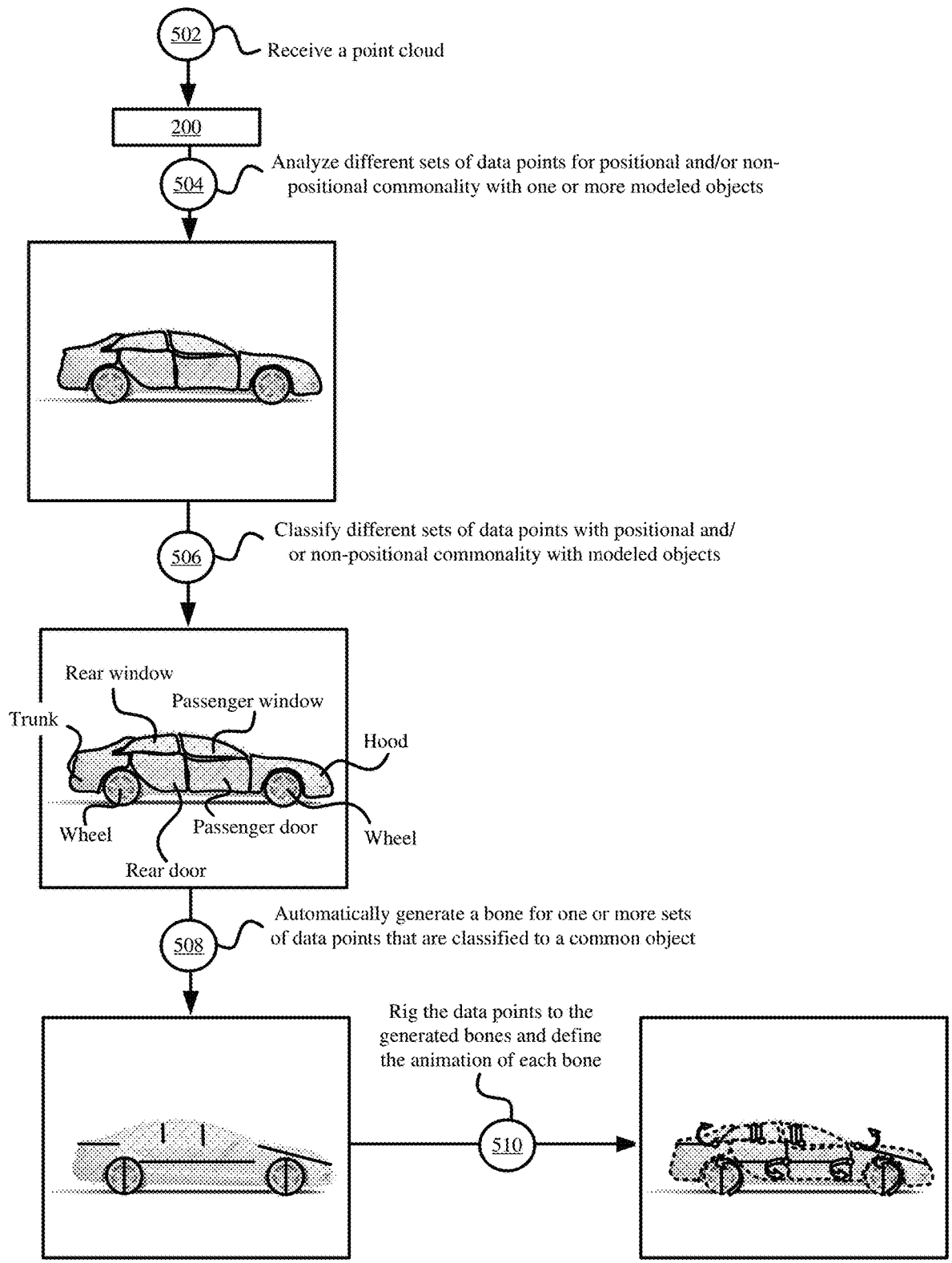
FIG. 5 illustrates an example for the fully automated rigging of point cloud data points in accordance with some embodiments presented herein.

FIG. 5 illustrates an example for the fully automated rigging of point cloud data points performed by PCRS 200 in accordance with some embodiments presented herein. PCRS 200 may receive (at 502) a point cloud with an instruction to perform the fully automated rigging. The point cloud may be a static capture of a scene or environment with one or more objects. In other words, the point cloud data points may be statically positioned and/or may not be animated.

PCRS 200 may use one or more AI/ML technique to analyze (at 504) the positional and non-positional elements of different sets of data points in the point cloud. In some embodiments, PCRS 200 may analyze (at 504) the different sets of data points for positional and/or non-positional commonality. In some embodiments, PCRS 200 may analyze (at 504) the different sets of data points to determine whether the positional and non-positional elements of the different sets of data points match or are similar to the positional and non-positional elements of modeled objects.

PCRS 200 may classify (at 506) one or more sets of data points in response to the positional and non-positional elements of the one or more sets of data points having commonality with the structure, arrangement, coloring, and/or other attributes of a modeled object.

In some embodiments, the analysis (at 504) may include differentiating between the sets of data points based on different positional and/or non-positional commonality shared by the data points in each set of data points. For instance, if the color values of a first set of neighboring data points are within a threshold range of one another, PCRS 200 may automatically classify (at 506) that first set of neighboring data points as being associated with a first object. Similarly, if PCRS 200 detects a repeating pattern in the positional elements or a particular arrangement of a second set of data points, PCRS 200 may automatically classify (at 506) that second set of neighboring data points as being associated with a second object.

In some embodiments, the analysis (at 504) may include comparing the positional and non-positional elements of the set of data points against positional and non-positional elements of previously modeled objects. In some such embodiments, PCRS 200 may include a database that stores the commonality, patterns, and positional and/or non-positional differentiating characteristics of the different objects. For instance, the database may store the positional and non-positional commonality that differentiates a wooden surface from a metal or plastic surface.

PCRS 200 may automatically generate (at 508) a bone for one or more sets of data points that are classified to a common object. In some embodiments, PCRS 200 may generate (at 508) each bone to form a continuous skeletal framework, and may avoid generating bones for a detached or removed set of data points that are classified to an object. In some other embodiments, PCRS 200 may generate a bone based on the classification of a set of data points. For instance, if the set of data points is classified as a wheel, arm, or fan, then PCRS 200 may generate (at 508) a bone that spans the length of the set of data points. However, if the set of data points is classified as an inanimate object such as a building wall, then PCRS 200 may discard that set of data points and may not generate a bone for that set of data points.

PCRS 200 may autonomously rig (at 510) the one or more sets of data points to the generated (at 508) bone for animation. The rigging (at 510) may include defining the animation for the bones and the attached data points. Accordingly, the rigging (at 510) may further include defining the pivot points, weighting, parenting, kinematics, and/or other animation properties for each bone and the collective skeletal framework.

Figure 6:
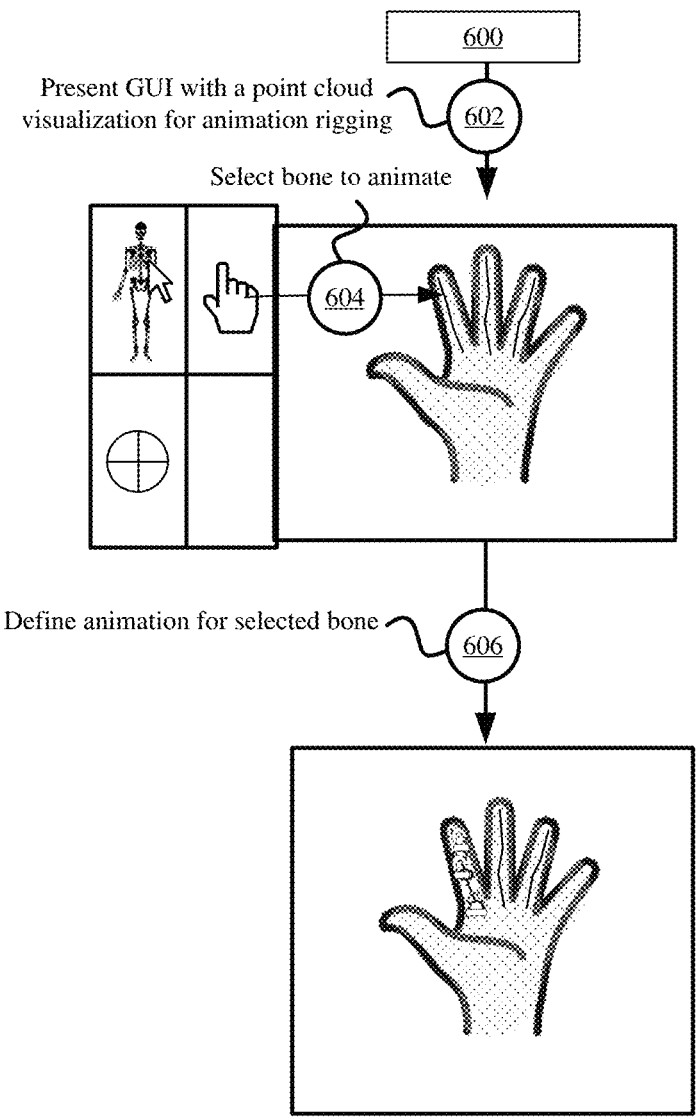
FIG. 6 illustrates an example of defining the animation for a set of point cloud data points that is linked to a skeletal framework bone in accordance with some embodiments presented herein.

FIG. 6 illustrates an example of defining the animation for a set of point cloud data points that is linked to a skeletal framework bone in accordance with some embodiments presented herein. PCRS 200 may present (at 602) a GUI and interactive tools that allow a user to select (at 604) a particular bone of the skeletal framework that has been linked to a set of data points.

The user may define (at 606) the animation for the particular bone, and PCRS 200 may apply the animation to the linked set of data points. Defining (at 606) the animation may include attaching one or more pivot points to one or more endpoints of the bone. In some embodiments, the user may add a pivot point at any point along the bone to segment the bone into additional pieces and add additional or different motion to the set of data points.

Each pivot point may be defined (at 606) to have a different range of motion. For instance, a first pivot point may be defined to rotate about a first axis over a first range, and a second pivot point may be defined to rotate about the first axis and a second axis over a second range.

Defining (at 606) the animation may include creating one or more parenting relationships between the particular bone and other neighboring or connected bones elsewhere in the skeletal framework. The parenting may connect the bones of the skeletal framework together so that movement or animation of one bone may affect other connected bones in the skeletal framework.

To define (at 606) the interaction between connected bones, each bone or pivot point may be defined with a weighting. The weighting may specify an amount of motion that transfers from a neighboring or connected bone elsewhere in the skeletal framework over to the particular bone, and the animation that is to occur to the particular bone when a force or movement is applied to the neighboring or connected bone.

In some embodiments, the linked set of data points will move in conjunction with the bone that they are linked to by keeping their distance as the bone is moved. In some embodiments, PCRS 200 may use AI/ML techniques to assist in the skeletal framework animation and/or to improve the quality of resulting animation.

Figure 7:
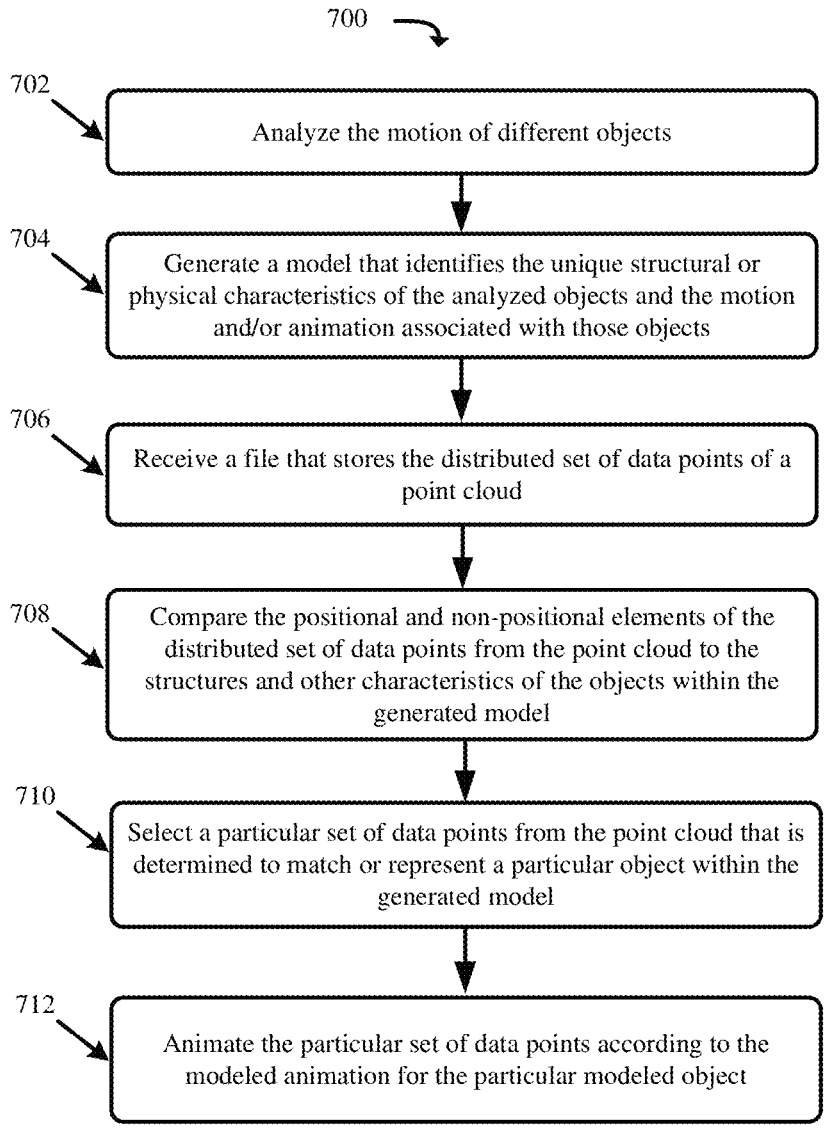
FIG. 7 presents a process for fully automated animation of point cloud data points in accordance with some embodiments presented herein.

In some embodiments, PCRS 200 may simplify the animation of different sets of data points that represent different objects within a point cloud by automatically defining the movement or animation of the different sets of data points. FIG. 7 presents a process 700 for fully automated animation of point cloud data points in accordance with some embodiments presented herein. Process 700 may be implemented by PCRS 200 using one or more AI/ML techniques.

Process 700 may include analyzing (at 702) a training set of videos or animations that visually present the motion of different objects. In particular, PCRS 200 may provide animations and/or videos of different elements and/or objects in motion to one or more AI/ML classifiers or neural networks. The animations and/or videos may be tagged with labels to identify the element or object in motion. For instance, PCRS 200 may input a first set of videos that show wheels of different cars in motion and that are labeled as such to the AI/ML classifiers, and may input a second set of videos that show doors of different cars opening and closing and that are labeled as such to the AI/ML classifiers.

The AI/ML classifiers may analyze (at 702) the different videos that show the same motion and/or that have a common label, and may determine structural commonality in the object that is in motion in the different videos as well as unique or common qualities in the range of motion. For instance, the AI/ML techniques may analyze (at 702) the first set of videos to determine that the animation consists of a circular or torus shaped black object that has a metallic center with one or more varying patterns rotating about a central pivot point in one direction, and may analyze (at 702) the second set of videos to determine that the animation consists of an angular polygonal form with a clear or transparent upper portion and a metallic or solid colored lower portion moving about a single pivot point at one end of the object across a single plane. In other words, the analysis (at 702) may include using AI/ML techniques to determine the unique physical and/or structural of an object in motion, the pivot points about the object where the motion occurs, the weighting of the motion, any parenting between the object and other objects, and/or other characteristics with respect to how the object moves or rotates about the one or more pivot points as determined by the AI/ML techniques.

Process 700 may include generating (at 704) a model that identifies the unique structural or physical characteristics of the analyzed objects and the motion and/or animation associated with those objects as determined by the AI/ML classifiers analyzing (at 702) the motion that is visually depicted in the training set of videos. In some embodiments, the model may include an initial set of connected synapses that identify the unique structural and physical characteristics of the different analyzed objects, and a second set of connected synapses that identify the unique range of motion that is detected for the analyzed objects. The unique range of motion may be defined to include the detected position of one or more pivot points about the structure of the object, the weighting of motion across the object, any detected parenting to other objects, and/or other characteristics with respect to how the object moves or rotates about the one or more pivot points.

Process 700 may include receiving (at 706) a file that stores the distributed set of data points of a point cloud. The point cloud may be of a static scene or environment that the user wishes to animate.

Process 700 may include comparing (at 708) the positional and non-positional elements of the distributed set of data points from the point cloud to the structures and other characteristics of the objects within the generated (at 704) model. In other words, the comparison (at 708) may be performed to automatically identify objects represented by different sets of the point cloud data points, and to retrieve the animation that has been modeled for an object represented by a set of the point cloud data points. A user may accelerate the comparison (at 708) by providing input to PCRS 200 that identifies what objects are represented in the point cloud so that PCRS 200 may limit the comparisons to models of similar objects.

Process 700 may include selecting (at 710) a particular set of data points from the point cloud that is determined to match or represent the structure, physical, color, and/or other characteristics (e.g., reflectivity, luminance, hardness, and other non-positional elements) of an object that was modeled from the training set of videos by the AI/ML techniques. For instance, PCRS 200 may determine that the data points of the particular set of data points have positional elements that form a structure that matches those of a modeled vehicle wheel, and that the data points have non-positional elements that have color characteristics, material properties, and/or other attributes that are similar to the color characteristics, material properties, and/or other attributes of the modeled vehicle wheel.

Process 700 may include animating (at 712) the particular set of data points according to the modeled animation for the particular modeled object. In some embodiments, animating (at 712) the particular set of data points may include automatically defining a bone, linking the particular set of data points to the bone, and defining pivot points, weighting, parenting, and/or other characteristics related to the motion of the bone based on the animation that was modeled for the particular modeled object from the training set of videos or animations by the AI/ML techniques. In some embodiments, animating (at 712) the particular set of data points may include applying the motion from the particular modeled object to the particular subset of data points. Specifically, PCRS 200 may map each data point from the particular subset of data points to a corresponding point on the particular modeled object, and may animate (at 712) each data point so that its movements match the movements that were modeled for the mapped or corresponding point of the particular modeled object. In other words, PCRS 200 may animate (at 712) the particular set of data points by mapping the animation from different features, surfaces, and/or points of the particular modeled object to specific data points of the particular set of data points.

For example, PCRS 200 may determine that the particular set of data points is defined with positional elements that form a structure that represents or matches by a threshold amount to the structure of an animated vehicle wheel from the model, and that the particular set of data points are defined with non-positional elements (e.g., coloring, reflectivity, etc.) that represent or match by a threshold amount to the visual characteristics of the modeled vehicle wheel. PCRS 200 may then animate the particular set of data points to move (e.g., rotate) about a central pivot point similar to the animation that was modeled for the vehicle wheel in the training set of videos, and the data points that are rotated towards the bottom may be compressed or moved closer together to replicate the compression that was modeled from the training set of videos for the portion of the vehicle wheel that makes ground contact.

Animating (at 712) the particular set of data points may include rendering the motion or presenting the movement of the data points from a last starting position to an ending position defined for the animation. Animating (at 712) the particular set of data points also includes hiding or not presenting the bones of the skeletal framework when animating the particular set of data points and/or rendering the point cloud with or without the animation.

In some embodiments, PCRS 200 may maintain or improve the resolution or quality of the animated data points. In some such embodiments, PCRS 200 may maintain data point density for a set of data points that is connected to a bone that is defined with an animation that expands or contracts the connected set of data points. For instance, the set of data points may represent a muscle that is attached to a bone. When the bone is animated in a first direction, the desired animation may include contracting the muscle. The contraction may be represented by grouping the set of data points closer together in the form of the contracted muscle. However, when the bone is animated in a second direction, the desired animation may include extending or flexing the muscle. The flexion may be represented by increasing the distance between the set of data points. The separation reduces the data point density, thereby lowering the resolution or detail of the muscle in the extended or flexed state.

When animating the same muscle movement with one or more meshes or polygons, the meshes or polygons may be shrunk or stretched to represent the muscle movement. The same technique cannot be performed for point cloud data points. Accordingly, PCRS 200 may use one or more AI/ML techniques to animate the point cloud data points without loss of resolution or detail.

Figure 8:
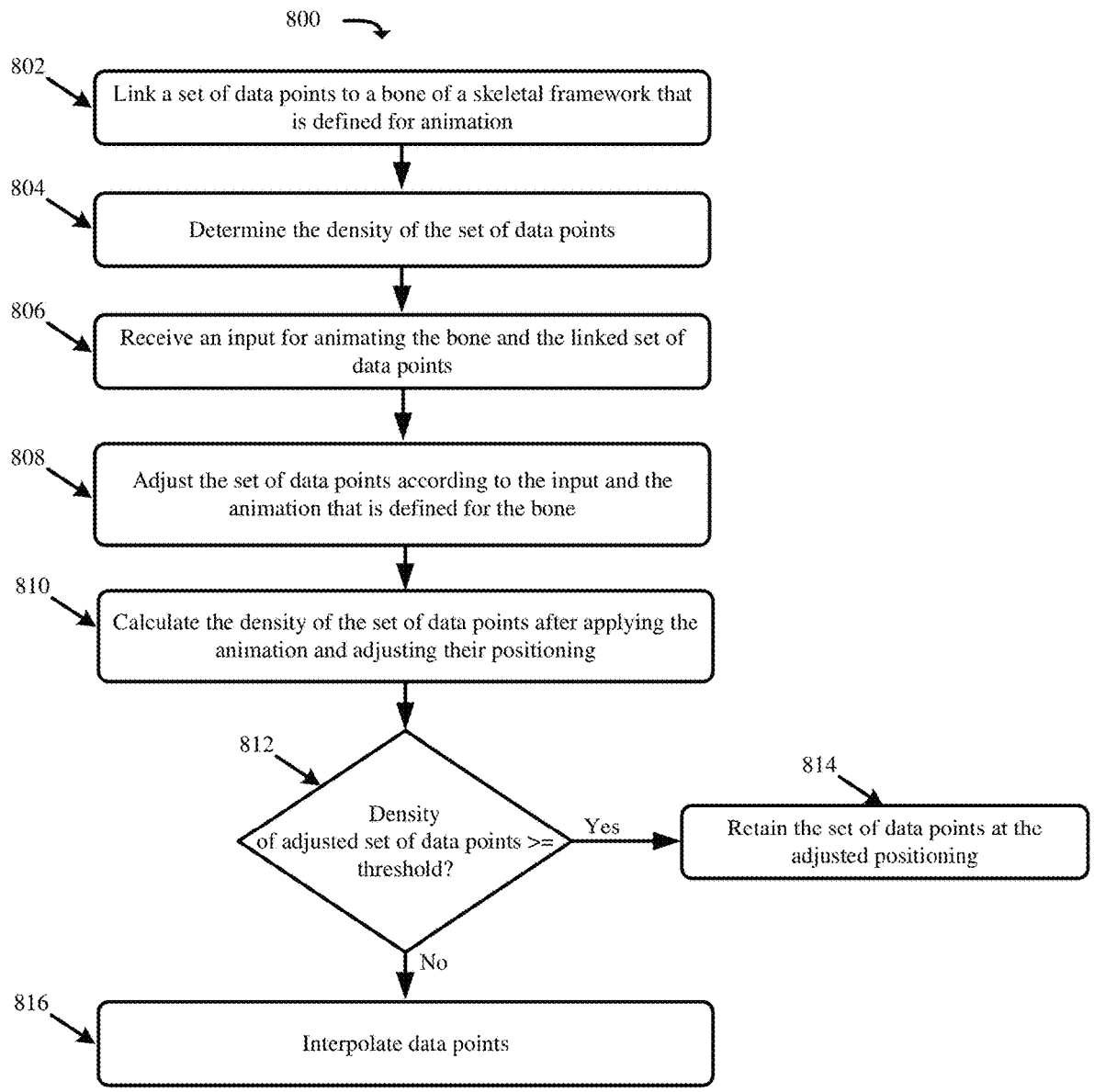
FIG. 8 presents a process for animating point cloud data points without losing detail in accordance with some embodiments presented herein.

FIG. 8 presents a process 800 for animating point cloud data points without losing detail in accordance with some embodiments presented herein. Process 800 may be implemented by PCRS 200 using one or more AI/ML techniques.

Process 800 may include linking (at 802) a set of data points to a bone of a skeletal framework that is defined for animation. Linking (at 802) the set of data points may include selecting a group of data points from a point cloud that move in relation to the linked bone. The bone may be defined with one or more pivot points, weighting, and/or parenting to other bones of the skeletal framework that collectively define the animation for the bone and the linked set of data points.

Process 800 may include determining (at 804) the density of the set of data points. The density may be defined based on the distance separating neighboring data points or the number of data points that are within a specified volume of space. Different densities may be computed for different subsets of the set of data points. For instance, PCRS 200 may determine a first density between a first subset of data points that have a first set of color values, and a second density between a second subset of data points that have a second set of color values.

Process 800 may include receiving (at 806) an input for animating the bone and the linked set of data points. In some embodiments, the input may be defined directly for the bone. In some other embodiments, the input may result from one or more of forward kinematics or inverse kinematics in which a movement of one bone in the skeletal framework transfers and causes movement to one or more other bones including the bone with the linked set of data points.

Process 800 may include adjusting (at 808) the set of data points according to the input and the animation that is defined for the bone. Adjusting (at 808) the set of data points may include repositioning the set of data points in relation to the movement of the bone. In some embodiments, the repositioning may include moving a first subset of data points more or less than a second subset of data points in order to produce a stretching, expansion, or extension animation.

Process 800 may include calculating (at 810) the density of the set of data points after applying the animation and adjusting (at 808) their positioning. Process 800 may include comparing the densities before and after the adjusted positioning to determine (at 812) whether the density has decreased beyond a threshold. In other words, PCRS 200 may determine (at 812) whether the resolution or quality of the set of data points has degraded by more than the threshold as a result of the applied adjustment.

Process 800 may include retaining (at 814) the set of data points at the adjusted positioning in response to determining (at 812—Yes) that the density of data points has increased or remained within the threshold of the original density, and that there is no loss in detail or resolution for the object represented by the set of data points. Process 800 may include interpolating (at 816) data points in response to determining (at 812—No) that the density of the set of data points has decreased by more than the threshold amount from the original density. The interpolation (at 816) may include generating new data points to add to the set of data points to restore the density in regions affected by the animation. In other words, the interpolation (at 816) adds new data points to the adjusted set of data points so that the object represented by the adjusted set of data points (whether stretched, extended, or otherwise expanded over a larger region of 3D space) has the same or similar resolution or quality to the original object represented by the unadjusted set of data points from the original point cloud.

In some embodiments, the interpolated data points may be inserted in between two data points from the set of data points that have been repositioned more than a threshold distance away from one another. The interpolated data points may inherent the non-positional elements and/or characteristics of the neighboring data points. For instance, an interpolated data point may be generated at a position that is the average of the x, y, and z coordinate values of two or more data points that have been moved more than the threshold distance away from each other, and may be defined with color values that are the average of the color values of the two or more data points that have been moved more than the threshold distance away from each other. In some embodiments, PCRS 200 may tag the interpolated data points to differentiate them from the original set of data points. PCRS 200 may remove the tagged data points once the animation is reversed causing the density of the original set of data points to be back within the threshold amount.

In some embodiments, the point cloud data points may be stored in a separate file than the animation definition file. The animation definition file may include the definition of each bone in one or more skeletal frameworks. The skeletal framework may be defined as a linked list or other hierarchical structure. Each bone may be defined with a default or resting position in 3D space, a shape, an identifier that uniquely identifies the bone from other bones in the skeletal framework, and/or an array or linked list of data points that may be linked to the bone. The animation definition file may also specify a time coded sequence of movements for the various bones of the skeletal framework. In some embodiments, the animation definition file may define the movements based on forces (e.g., wind, gravity, deflection, elasticity, etc.).

The separation of the animation definition file from the point cloud file may allow the same animation to be applied to different point clouds. For instance, a first point cloud representing a first object may have a first set of data points that are linked to the bones of a skeletal framework defined in a particular animation definition file (e.g., contain non-positional elements with identifiers of the linked bones), and a different second point cloud representing a second object may have a second set of data points that are linked to the same bones of the same skeletal framework defined in the particular animation definition file. Accordingly, an animation may be defined in the particular animation definition file to perform various movements of the bones, and those movements may be simultaneously applied to the first set of data points of the first point cloud and the second set of data points of the second point cloud. An animator may then visualize the animation on two separate objects (e.g., two separate point clouds) without having to redefine the animation for each point cloud. Instead, the animator may simply rig or link the first set of data points from the first point cloud and the second set of data points from the second point cloud to the bones of the same particular definition file.

PCRS 200 may then apply the animation to the data points of whichever point cloud is selected and is linked to those bones.

The separation of the animation definition file from the point cloud file may also allow for different skeletal frameworks and animations to be linked to the same set of data points or point cloud. Accordingly, an animator may compare different animations that are applied to the point cloud without having to store two copies of the point cloud data points.

In some embodiments, the skeletal framework and animation may be stored and/or encoded as part of the point cloud file. In some such embodiments, the animation may be exported with the point cloud as one file. By encoding the animation with the point cloud file, edits made to the point cloud data points may be directly mapped to the animation, and edits made to the animation may be directed mapped to the point cloud.

Figure 9:
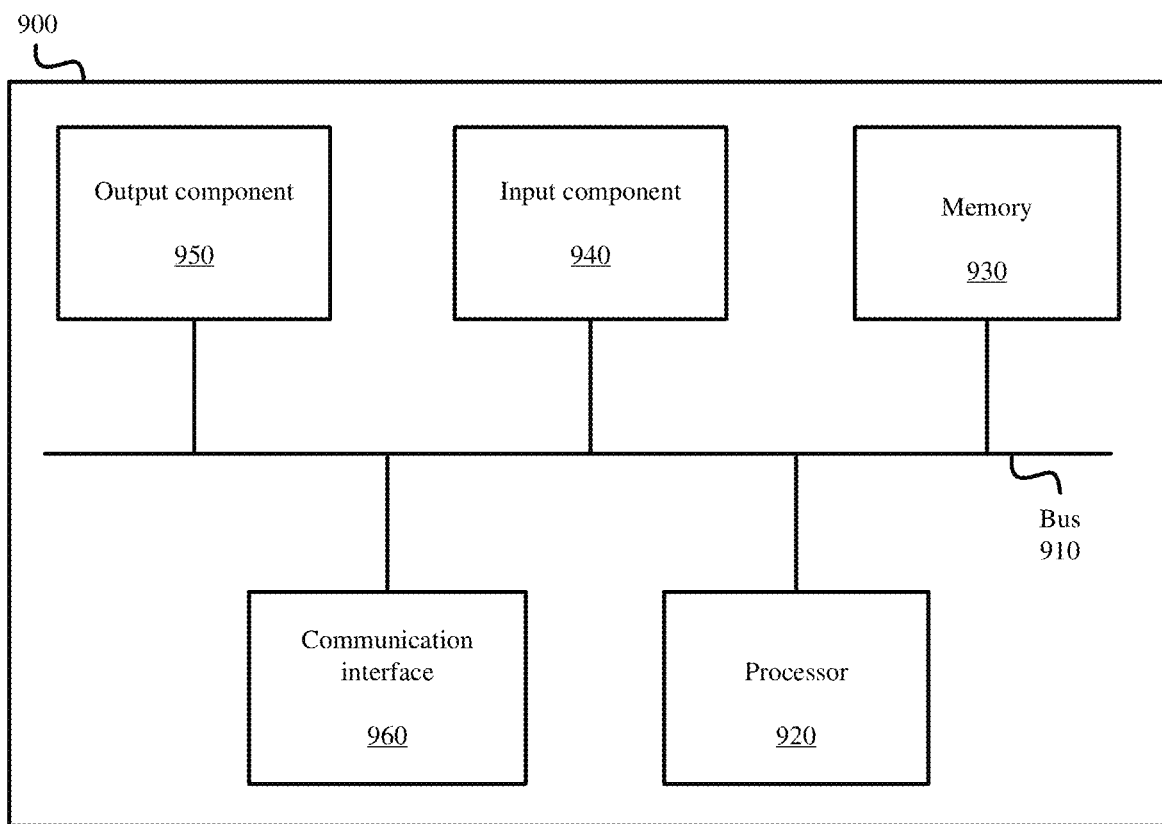
FIG. 9 illustrates example components of one or more devices, according to one or more embodiments described herein.

FIG. 9 is a diagram of example components of device 900. Device 900 may be used to implement one or more of the devices or systems described above (e.g., PCRS 200). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    modeling one or more of a shape or visual characteristics of a plurality of different objects;
    receiving a plurality of data points that are distributed in a space, wherein each data point of the plurality of data points comprises a plurality of elements that define (i) a position of the data point in the space, and (ii) visual characteristics of the data point;
    expanding a selection within a region of the space that includes a first set of data points from the plurality of data points in the region and that excludes a second set of data points from the plurality of data points in the region based on the plurality of elements of the first set of data points defining positions and visual characteristics that are in common by a threshold amount to the shape or the visual characteristics of a particular object from the plurality of different objects, and based on the plurality of elements of the second set of data points defining positions and visual characteristics that differ by more than the threshold amount from the shape or the visual characteristics of the particular object;
    rigging the first set of data points for collective movement, wherein said rigging comprises defining a pivot point and a distance that is retained when moving each data point from the first set of data points about the pivot point; and
    animating the first set of data points to move in relation to one another and the pivot point based on said rigging of the first set of data points for the collective movement.

2. The method of claim 1 further comprising:
    modeling a motion associated with each object of the plurality of different objects; and
    defining the pivot point and the distance that is retained for said animating of the first set of data points based on a mapping of the first set of data points to different points about the particular object and the motion associated with the different points about the particular object.

3. The method of claim 1 further comprising:
    modeling a motion of the particular object; and
    wherein animating the first set of data points comprises mapping the first set of data points to different points of the particular object and moving the first set of data points according to the motion of the particular object.

4. The method of claim 1,
    wherein rigging the first set of data points further comprises defining a bone that extends from the pivot point and linking the first set of data points to the bone; and
    wherein animating the first set of data points comprises moving the first set of data points in relation to a movement of the bone about the pivot point.

5. The method of claim 1,
    wherein rigging the first set of data points further comprises linking the first set of data points to a particular shape; and
    wherein animating the first set of data points comprises moving the particular shape about the pivot point and maintaining a position of the first set of data points relative to the particular shape.

6. The method of claim 1,
    wherein rigging the first set of data points further comprises linking the first set of data points to a framework; and
    wherein animating the first set of data points comprises:
        determining a movement that is defined for the framework; and
        adjusting positions of the first set of data points in relation to the movement that is defined for the framework.

7. The method of claim 1, wherein animating the first set of data points comprises:
    moving the first set of data points to match a motion of the particular object.

8. The method of claim 1 further comprising:
    modeling a motion of the particular object;
    defining an animation for the first set of data points based on the modeling of the motion of the particular object; and
    wherein animating the first set of data points comprises mapping the motion of the particular object to the first set of data points based on said defining of the pivot point and the distance that is retained when moving each data point from the first set of data points about the pivot point.

9. The method of claim 1 further comprising:
    defining an animation involving motion of a single structure; and
    wherein animating the first set of data points comprises moving the first set of data points in relation to the motion of the single structure.

10. The method of claim 1 further comprising:
    associating a common identifier to each data point of the first set of data points in response to rigging the first set of data points, wherein associating the common identifier comprises modifying at least one of the plurality of elements with a common value that indicates that the first set of data points move in combination with one another;
    defining a movement;
    associating the common identifier to the movement; and
    wherein animating the first set of data points comprises applying the movement to the first set of data points based on said associating of the common identifier to the movement and said associating of the common identifier to each data point of the first set of data points.

11. The method of claim 1, wherein expanding the selection comprises:
    receiving a user selection of a single data point from the plurality of data points; and automatically selecting the first set of data points that surround the single data point based on the visual characteristics of the first set of data points being within a threshold range of visual characteristics of the single data point from the user selection.

12. The method of claim 1,
wherein rigging the first set of data points further comprises mapping the first set of data points to corresponding points from a model of the particular object; and
wherein animating the first set of data points comprises moving the first set of data points in relation to movements of the corresponding points in the model of the particular object.

13. The method of claim 1, wherein animating the first set of data points comprises:
determining that the particular object compresses or expands during movement; and
adjusting positioning of the first set of data points during movement about the pivot point to match a compression or expansion of the particular object.

14. A system comprising:
one or more hardware processors configured to:
model one or more of a shape or visual characteristics of a plurality of different objects;
receive a plurality of data points that are distributed in a space, wherein each data point of the plurality of data points comprises a plurality of elements that define (i) a position of the data point in the space, and (ii) visual characteristics of the data point;
expand a selection within a region of the space that includes a first set of data points from the plurality of data points in the region and that excludes a second set of data points from the plurality of data points in the region based on the plurality of elements of the first set of data points defining positions and visual characteristics that are in common by a threshold amount to the shape or the visual characteristics of a particular object from the plurality of different objects, and based on the plurality of elements of the second set of data points defining positions and visual characteristics that differ by more than the threshold amount from the shape or the visual characteristics of the particular object;
rig the first set of data points for collective movement, wherein said rigging comprises defining a pivot point and a distance that is retained when moving each data point from the first set of data points about the pivot point; and
animate the first set of data points to move in relation to one another and the pivot point based on said rigging of the first set of data points for the collective movement.

15. The system of claim 14, wherein the one or more hardware processors are further configured to:
model a motion associated with each object of the plurality of different objects; and
define the pivot point and the distance that is retained for said animating of the first set of data points based on a mapping of the first set of data points to different points about the particular object and the motion associated with the different points about the particular object.

16. The system of claim 14, wherein the one or more hardware processors are further configured to:
model a motion of the particular object; and
wherein animating the first set of data points comprises mapping the first set of data points to different points of the particular object and moving the first set of data points according to the motion of the particular object.

17. The system of claim 14,
wherein rigging the first set of data points further comprises defining a bone that extends from the pivot point and linking the first set of data points to the bone; and
wherein animating the first set of data points comprises moving the first set of data points in relation to a movement of the bone about the pivot point.

18. A non-transitory computer-readable medium storing a plurality of processor-executable instructions that, when executed by one or more processors, cause a computing system to perform operations comprising:
model one or more of a shape or visual characteristics of a plurality of different objects;
receive a plurality of data points that are distributed in a space, wherein each data point of the plurality of data points comprises a plurality of elements that define (i) a position of the data point in the space, and (ii) visual characteristics of the data point;
expand a selection within a region of the space that includes a first set of data points from the plurality of data points in the region and that excludes a second set of data points from the plurality of data points in the region based on the plurality of elements of the first set of data points defining positions and visual characteristics that are in common by a threshold amount to the shape or the visual characteristics of a particular object from the plurality of different objects, and based on the plurality of elements of the second set of data points defining positions and visual characteristics that differ by more than the threshold amount from the shape or the visual characteristics of the particular object;
rig the first set of data points for collective movement, wherein said rigging comprises defining a pivot point and a distance that is retained when moving each data point from the first set of data points about the pivot point; and
animate the first set of data points to move in relation to one another and the pivot point based on said rigging of the first set of data points for the collective movement.

* * * * *